United States Patent
Willis et al.

(10) Patent No.: US 9,904,884 B2
(45) Date of Patent: Feb. 27, 2018

(54) METHOD AND SYSTEMS FOR DETECTING TURBOCHARGER IMBALANCE WITH AN RFID CIRCUIT

(71) Applicant: General Electric Company, Schenectady, NY (US)

(72) Inventors: Jeffrey David Willis, Harborcreek, PA (US); Bret Dwayne Worden, Union City, PA (US)

(73) Assignee: General Electric Company, Schenectady, NY (US)

(*) Notice: Subject to any disclaimer, the term of this patent is extended or adjusted under 35 U.S.C. 154(b) by 297 days.

(21) Appl. No.: 14/607,158

(22) Filed: Jan. 28, 2015

(65) Prior Publication Data

US 2015/0211951 A1    Jul. 30, 2015

Related U.S. Application Data

(60) Provisional application No. 61/933,173, filed on Jan. 29, 2014.

(51) Int. Cl.
| | |
|---|---|
| *G01M 15/12* | (2006.01) |
| *G06K 19/07* | (2006.01) |
| *F02C 6/12* | (2006.01) |
| *G06K 19/077* | (2006.01) |

(52) U.S. Cl.
CPC ............ *G06K 19/0716* (2013.01); *F02C 6/12* (2013.01); *G01M 15/12* (2013.01); *G06K 19/07798* (2013.01); *F05D 2220/40* (2013.01); *F05D 2260/80* (2013.01)

(58) Field of Classification Search
CPC .................................................. G01M 15/12
USPC ............................................................. 73/487
See application file for complete search history.

(56) References Cited

U.S. PATENT DOCUMENTS

| 4,237,454 | A | * | 12/1980 | Meyer ................... G01H 1/003 |
|---|---|---|---|---|
| | | | | 310/323.21 |
| 5,574,431 | A | | 11/1996 | McKeown et al. |
| 5,685,038 | A | | 11/1997 | Smith et al. |
| 7,880,594 | B2 | | 2/2011 | Breed et al. |
| 7,886,168 | B2 | | 2/2011 | Lertora et al. |
| 8,205,503 | B2 | | 6/2012 | Cox |
| 8,330,610 | B2 | | 12/2012 | Freissle et al. |
| 8,400,270 | B2 | | 3/2013 | Brand |

(Continued)

FOREIGN PATENT DOCUMENTS

| EP | 2434622 A2 | 3/2012 |
|---|---|---|
| JP | 2001351487 A * | 12/2001 |

(Continued)

OTHER PUBLICATIONS

International Search Report and Written Opinion issued in connection with corresponding PCT Application No. PCT/US2015/013399 dated May 27, 2015.

*Primary Examiner* — Lisa Caputo
*Assistant Examiner* — Jamel Williams
(74) *Attorney, Agent, or Firm* — GE Global Patent Operation; John A. Kramer (57) ABSTRACT

Various methods and systems are provided for diagnosing a rotating device. In one example, a system includes a rotating device and a RFID circuit coupled to the rotating device. The RFID circuit includes a RFID chip, an antenna, and a mechanical link designed to change impedance with a changing input from the rotating device.

19 Claims, 5 Drawing Sheets

(56) References Cited

U.S. PATENT DOCUMENTS

| | | | |
|---|---|---|---|
| 2009/0306839 A1* | 12/2009 | Youngquist | G01K 7/021 701/14 |
| 2013/0067914 A1 | 3/2013 | Malone et al. | |
| 2013/0067915 A1* | 3/2013 | Flynn | F02D 41/221 60/602 |
| 2013/0174658 A1 | 7/2013 | Kataoka et al. | |

FOREIGN PATENT DOCUMENTS

| | | |
|---|---|---|
| WO | 01/69524 A2 | 9/2001 |
| WO | 2013/014543 A1 | 1/2013 |

* cited by examiner

METHOD AND SYSTEMS FOR DETECTING TURBOCHARGER IMBALANCE WITH AN RFID CIRCUIT

CROSS REFERENCE TO RELATED APPLICATIONS

This application claims priority to U.S. Provisional Patent Application No. 61/933,173 filed Jan. 29, 2014, which is hereby incorporated in its entirety herein by reference for all purposes.

FIELD

Embodiments of the subject matter disclosed herein relate to internal combustion engine systems. Other embodiments relate to turbochargers.

BACKGROUND

Turbochargers may be used in an engine system to increase a pressure of air supplied to the engine for combustion. In one example, the turbocharger includes a turbine coupled in an exhaust passage of the engine which at least partially drives a compressor via a shaft to increase the intake air pressure. During operation, turbochargers may become imbalanced, thereby displaying high levels of vibration and large variations in oil pressure within an oil cavity surrounding the turbocharger shaft. If the imbalance and vibration continues without servicing, severe turbocharger degradation and/or failure may result. For example, if the imbalance increases above a threshold, the turbocharger may fail within a period of time. In one example, the threshold may include a threshold change in vibration levels or oil pressure within a threshold frequency range.

BRIEF DESCRIPTION

In one embodiment, a system comprises a rotating device and a radiofrequency identification (RFID) circuit coupled to the rotating device. The RFID circuit includes a RFID chip, an antenna, and a mechanical link configured to change impedance responsive to a changing input from the rotating device. Operation of the RFID circuit may be based in part on the change of impedance, e.g., the RFID circuit may be configured to change from an inoperational state to an operational state (or vice versa) based on the change of impedance. In one example, the rotating device is a turbocharger.

The changing impedance may be indicative of turbocharger imbalance. In one example, the mechanical link may be a breakable resonant link. The changing input may be a vibration level within a threshold force range at a frequency in a threshold frequency range. The threshold ranges may correspond to a threshold amount of imbalance indicating potential turbocharger degradation and/or failure. If the vibration increases above the designated threshold, the mechanical link may break, thereby causing the RFID circuit impedance to change. The change in impedance may be measurable by the RFID chip and may cause a remote RFID reader positioned within a range of the RFID circuit to receive a signal including information stored on the RFID chip. If the threshold change in impedance is achieved, the signal received by the reader may change, thereby indicating turbocharger degradation. In this way, early detection of turbocharger imbalance may allow for turbocharger servicing and/or replacement before catastrophic turbocharger degradation, thereby reducing engine degradation.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
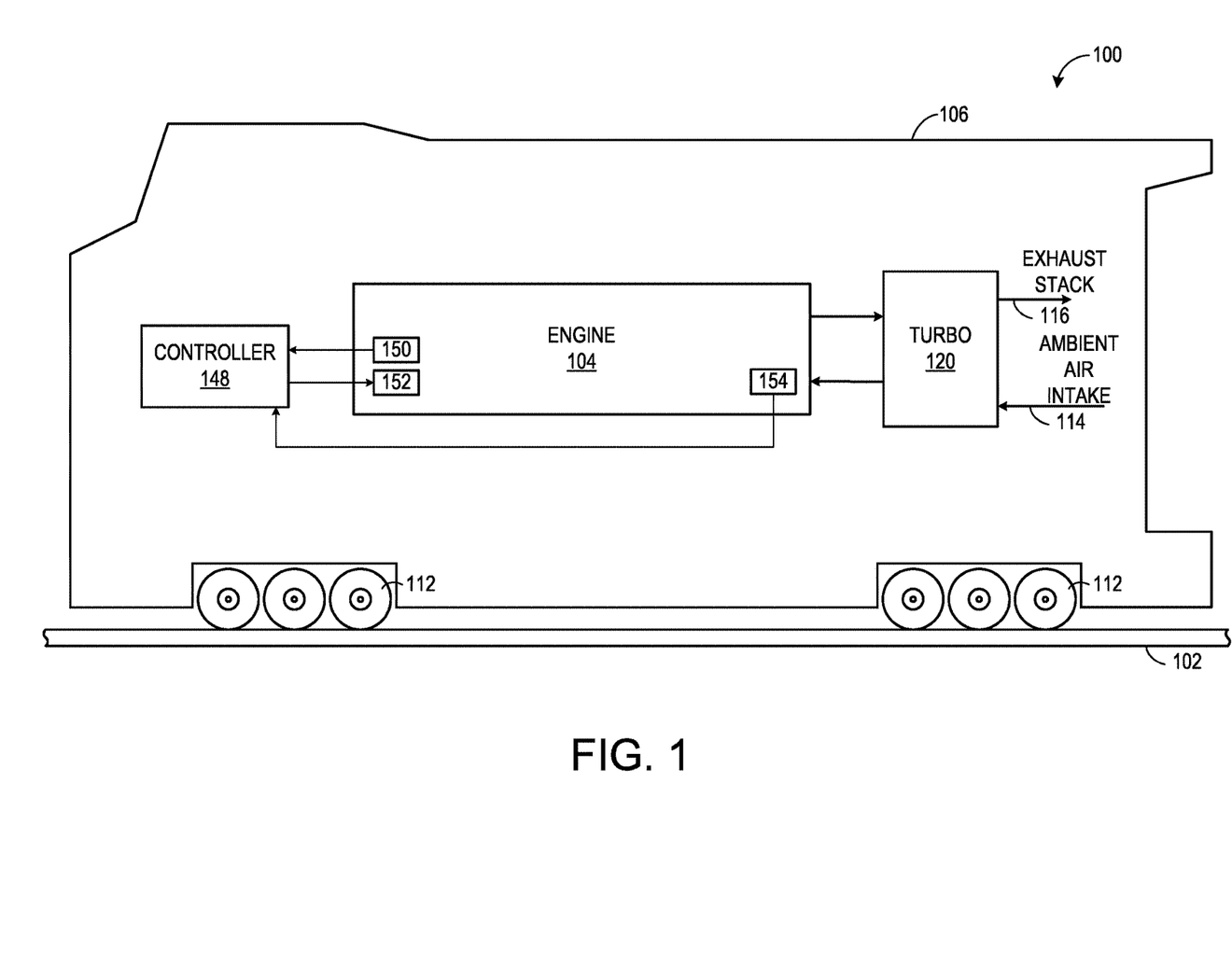
FIG. 1 shows a schematic diagram of a vehicle with a turbocharger according to an embodiment of the invention.
Figure 2:
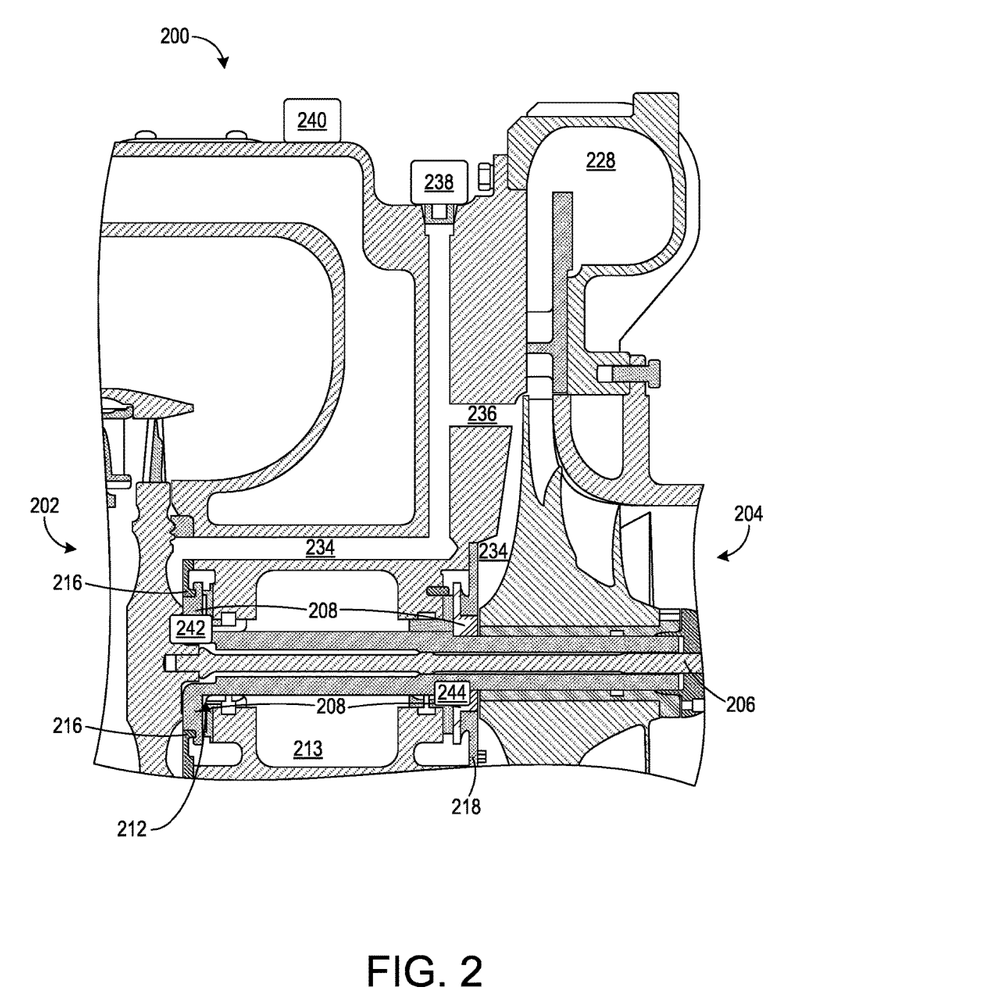
FIG. 2 shows a cross-sectional view of a portion of a turbocharger according to an embodiment of the invention.

The following description relates to various embodiments of methods and systems for diagnosing a rotating device. (The rotating device is a device that includes at least one part, e.g., a shaft, that is configured to rotate in at least one operational mode of the device.) Diagnosing the rotating device may include determining when the rotating device has reached an imbalance threshold indicative of pending device failure (e.g., catastrophic failure of one or more components of the device). In one example, the rotating device may be a turbocharger, such as the turbocharger shown in FIGS. 1-2. A degraded turbocharger component (such as a compressor or turbine wheel) may result in an increase in turbocharger imbalance. Turbocharger imbalance may cause an increase in vibration of the turbocharger. As a shaft of the turbocharger vibrates, oil pressures within an oil cavity surrounding the shaft may fluctuate at increasing frequency. Sensors such as accelerometers and pressure sensors may detect these indicators; however, an engine controller may be required to process the data from the sensors. This may add costs and complexity to the engine controller which may not have additional input/output positions for these engine sensors. Instead, a radiofrequency identification (RFID) chip may be coupled to a sensor or a mechanical component sensitive to turbocharger imbalance. The RFID chip may be further coupled to an antenna in an RFID circuit, the antenna outputting a signal to a RFID reader. Based on the signal received by the RFID reader, a user may diagnose the turbocharger. Specifically, information transferred to the RFID reader may determine if the turbocharger has reached the imbalance threshold. Example RFID circuits are shown at FIGS. 3-6. The RFID circuits may be coupled to different locations on or within the turbocharger, as shown at FIG. 2. A method for determining turbocharger degradation and imbalance based on the signal (e.g., impedance) received from the RFID circuit is shown at FIG. 7.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the approach for determining turbocharger imbalance with an RFID circuit, an example platform in which the turbocharger may be installed is shown. Specifically, FIG. 1 shows a block diagram of an embodiment of a vehicle system 100, herein depicted as a rail vehicle 106 (e.g., locomotive), configured to run on a rail 102 via a plurality of wheels 112. As depicted, the rail vehicle 106 includes an engine system with an engine 104, such as an internal combustion engine.

The engine 104 receives intake air for combustion from an intake passage 114. The intake passage 114 receives ambient air from an air filter (not shown) that filters air from outside of the rail vehicle 106. Exhaust gas resulting from combustion in the engine 104 is supplied to an exhaust passage 116. Exhaust gas flows through the exhaust passage 116, and out of an exhaust stack of the rail vehicle 106.

The engine system includes a turbocharger 120 ("TURBO") that is arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 may include a compressor (not shown in FIG. 1) which is at least partially driven by a turbine (not shown in FIG. 1). While in this case a single turbocharger is shown, the system may include multiple turbine and/or compressor stages. The turbocharger is described in greater detail below with reference to FIG. 2.

In some embodiments, the vehicle system 100 may further include an exhaust gas treatment system coupled in the exhaust passage upstream or downstream of the turbocharger 120. In one embodiment, the exhaust gas treatment system may include a diesel oxidation catalyst (DOC) and a diesel particulate filter (DPF). In other embodiments, the exhaust gas treatment system may additionally or alternatively include one or more emission control devices. Such emission control devices may include a selective catalytic reduction (SCR) catalyst, three-way catalyst, $NO_x$ trap, or various other devices or systems.

The rail vehicle 106 further includes a controller 148 to control various components related to the vehicle system 100. In one example, the controller 148 includes a computer control system. The controller 148 further includes computer readable storage media (not shown) including code for enabling on-board monitoring and control of rail vehicle operation. The controller 148, while overseeing control and management of the vehicle system 100, may be configured to receive signals from a variety of engine sensors 150, as further elaborated herein, in order to determine operating parameters and operating conditions, and correspondingly adjust various engine actuators 152 to control operation of the rail vehicle 106. For example, the controller 148 may receive signals from various engine sensors 150 including, but not limited to, engine speed, engine load, boost pressure, exhaust pressure, ambient pressure, exhaust temperature, intake manifold air pressure (MAP) 154, etc. Correspondingly, the controller 148 may control the vehicle system 100 by sending commands to various components such as traction motors, alternator, cylinder valves, throttle, etc. In one example, the controller 148 may shut down the engine in response to an engine crankcase pressure greater than a threshold pressure.

FIG. 2 shows a view of an embodiment of a turbocharger 200 that may be coupled to an engine, such as turbocharger 120 described above with reference to FIG. 1. The view shown in FIG. 2 is a cross-sectional view of a portion of the turbocharger 200. In one example, turbocharger 200 may be bolted to the engine. In another example, the turbocharger 200 may be coupled between the exhaust passage and the intake passage of the engine. In other examples, the turbocharger may be coupled to the engine by another suitable manner.

The turbocharger 200 includes a turbine 202 and a compressor 204. Exhaust gases from the engine pass through the turbine 202, and energy from the exhaust gases is converted into rotational kinetic energy to rotate a shaft 206 which, in turn, drives the compressor 204. Ambient intake air is compressed (e.g., pressure of the air is increased) as it is drawn through the rotating compressor 204 such that a greater mass of air may be delivered to the cylinders of the engine.

In some embodiments, the turbine 202 and the compressor 204 may have separate casings which are bolted together, for example, such that a single unit (e.g., turbocharger 200) is formed. As an example, the turbine may have a casing made of cast iron and the compressor may have a casing made of an aluminum alloy. In other examples, casings of the turbine and the compressor may be made of the same material. It should be understood the turbine casing and the compressor casing may be made of any suitable materials.

As depicted in FIG. 2, the compressor 204 includes a diffuser 228. In some embodiments, a pressure sensor may be positioned in the diffuser 228 to measure a pressure of the compressor casing. The diffuser 228 is a divergent duct in the compressor casing which converts velocity energy to pressure energy, for example. The pressure at the diffuser 228 may be substantially equal to the intake manifold air pressure (MAP).

The turbocharger 200 further includes bearings 208 to support the shaft 206, such that the shaft may rotate at a high speed with reduced friction. The turbocharger may further include a lubrication system to reduce degradation of the bearings and to maintain a temperature of the bearings (e.g., to keep the bearings cool). While the engine is in operation, a constant flow of engine oil or engine coolant may pass through the turbocharger, for example. In one example, pressurized engine oil may enter the turbocharger via an oil inlet (not shown). Excess oil may collect in an oil cavity 213, and the oil leaves the turbocharger 200 through an outlet (not shown) fluidly coupled with the oil cavity 213.

As depicted in FIG. 2, the turbocharger 200 further includes two non-contact seals (e.g., labyrinth seals), a turbine labyrinth seal 216 positioned between the oil cavity 213 and the turbine 202 and a compressor labyrinth seal 218 positioned between the oil cavity 213 and the compressor 204. The labyrinth seals 216 and 218 may reduce leakage of the engine oil used to lubricate the bearings 208 to the turbine 202 and the compressor 204, for example, by providing a contorted, tortuous path. Because the labyrinth seals 216 and 218 are non-contact seals, friction around the bearings 208 and the shaft 206 may be reduced, while oil leakage is also reduced.

The turbocharger 200 further includes a seal cavity 234 that extends from behind the compressor 204 near the compressor labyrinth seal 218 to an area near the turbine labyrinth seal 216. The seal cavity 234 is an air passage in the casing of the turbocharger 200. As shown in FIG. 2, the seal cavity 234 includes an orifice 236. The orifice is configured to generate a choked air flow. In such a configuration, the choked airflow may generate a greater pressure difference further downstream resulting in better detection of differences in pressure between various locations in the turbocharger 200. The seal cavity 234 further includes a pressure sensor 238 to measure a pressure in the seal cavity 234. As depicted in FIG. 2, the pressure sensor 238 is located at a port of the seal cavity 234. The pressure sensor 238 may be a transducer, for example, which generates a signal as a function of the pressure imposed. The pressure in the seal cavity 234 may be higher than the pressure in the oil cavity 213, for example, such that oil may be retained in the oil cavity. As an example, at notch eight of certain engine systems, the pressure sensor 238 may measure a pressure of approximately 27 psig (~2 bar).

During operation, the turbocharger 200 may become imbalanced, thereby displaying high levels of vibration. If the imbalance and vibration continues without servicing, severe turbocharger degradation and/or failure may result. Turbocharger imbalance may result from degraded turbocharger components. The degraded turbocharger components may include a broken bucket, a degraded compressor wheel, a degraded turbine blade, rotor imbalance, or the like.

Turbocharger imbalance may result in high levels of vibration at a frequency of once per revolution of the turbocharger. As the imbalance increases, the vibration levels may increase until the turbocharger fails. If the imbalance increases above a threshold, the turbocharger may fail within a period of time. If turbocharger imbalance and potential degradation is detected at this threshold, before the point of failure, turbocharger degradation and engine degradation due to turbocharger failure may be reduced. Early detection of turbocharger imbalance may allow for turbocharger servicing and/or replacement before catastrophic turbocharger degradation may result in further engine degradation.

In one example, a standard (e.g., "healthy") turbocharger imbalance tolerance may include a torque of substantially $2.12 \times 10^5$ N-m. If this torque increases by a threshold amount, the vibration levels may increase to a threshold level indicating potential turbocharger degradation resulting in failure. In one example, if the imbalance tolerance increases by 13 times, turbocharger degradation may be indicated. For example, an imbalance level of 13 times the imbalance tolerance may be a level at which the imbalance is detectable as turbocharger imbalance but does not result in immediate turbocharger failure. For example, at this imbalance level the turbocharger may have a period of time which it may operate imbalanced without causing significant degradation of the engine and catastrophic failure of the turbocharger. In other examples, if the imbalance tolerance increases by a number greater or less than 13 times, turbocharger degradation may be indicated.

In another example, an imbalance threshold for detecting turbocharger imbalance may be based on a turbocharger vibration level. The vibration level may include a vibration amplitude measured in g-force within a threshold frequency range. For example, the imbalance threshold may include vibration levels in a range from about 1 g to about 2.8 g (9.81-27.47 m/s$^2$) at a frequency in a range of about 325 Hz to about 345 Hz (e.g., approximately once per revolution of the turbocharger). In alternate embodiments, the imbalance threshold may be set to vibration levels greater or smaller than the above range. For example, the imbalance threshold may be in a range greater than 345 Hz and/or less than 325 Hz. Further, alternate g-levels greater than 2.8 g or less than 1 g for the imbalance threshold are also possible. In each case, the imbalance threshold may be set to a g-level and frequency range that is substantially equal to the resonance of the vibration cause by imbalanced rotating equipment (e.g., the turbocharger).

Turbocharger imbalance may also be indicated by changing oil pressure within an oil cavity 212 of the turbocharger 200, the oil cavity 212 in direct contact with journal bearings of the shaft 206. For example, as turbocharger imbalance increases, the shaft 206 may oscillate, squeezing and relieving pressure on the oil within the oil cavity 212. As a result, the oil pressure within the oil cavity 212 may fluctuate and increase to threshold levels. Thus, an imbalance threshold for detecting turbocharger imbalance may additionally or alternatively be based on a turbocharger oil cavity pressure level. The pressure level may include an oil pressure peak or threshold amplitude at a threshold frequency range. For example, the imbalance threshold may include oil pressure amplitudes in a range from about 6.9 kPa to about 41.5 kPa at a frequency in range from about 325 Hz to 345 Hz (e.g., approximately once per turbocharger revolution). In alternate embodiments, the imbalance threshold may be set to pressure values greater or smaller than the above range.

In this way, turbocharger imbalance and impending turbocharger failure may be detected based on turbocharger vibration increasing above threshold vibration levels at a threshold frequency and/or turbocharger oil cavity pressure increasing above threshold oil pressure levels at the threshold frequency. In some embodiments, vibration may be detected with a vibration sensor, such as an accelerometer, and oil cavity pressure may be detected with one or more pressures sensors in or around the oil cavity 212. However, monitoring outputs of the one or more sensors may require additional input and output ports to the engine controller (such as controller 148 shown in FIG. 1). If the engine control system does not have input/output ports (e.g., electrical connections) available for the required sensors, the imbalance parameters may not be detected in this way. Further, utilizing one or more imbalance sensors may require additional controller programming for turbocharger imbalance detection and corresponding indication of turbocharger degradation. Further still, these sensors may increase the cost and/or complexity of the engine system.

Instead, one or more RFID circuits may be coupled to the turbocharger. The RFID circuits may include an RFID chip including turbocharger data, an antenna, and a mechanical link (e.g., component) designed to change impedance (or resistance) responsive to a changing input from the turbocharger device. For example, the mechanical link may include a link sensitive to turbocharger vibration, increased turbocharger bearing pressure, and/or turbocharger oil cavity pressure. As such, as the turbocharger vibration and/or oil cavity pressure reaches the respective imbalance thresholds, the RFID circuit impedance may change. The change in impedance may be detected via the antenna with an RFID reading device. For example, the RFID reading device may detect a signal or detect no signal from the RFID based on whether the turbocharger has reached the imbalance threshold. The RFID reading device may be a remote device not included in the engine control system. Further details on the different types of RFID circuits are described below with reference to FIGS. 3-6.

As described above, one or more RFID circuits or systems may be positioned on the turbocharger in order to detect turbocharger imbalance before catastrophic degradation or failure. Returning to FIG. 2, three possible positions for the RFID circuits are shown. In alternate embodiments, more or less RFID circuits may be coupled to the turbocharger. In one example, a first RFID circuit 240 may be positioned on an outer housing or casing of the turbocharger. The first RFID circuit 240 may include one or more components for detecting the turbocharger vibration level. An example of the first RFID circuit 240 is shown in more detail at FIG. 3.

As shown in FIG. 2, the first RFID circuit 240 is positioned proximate to an outer casing of the turbocharger 202. In an alternate example, the first RFID circuit 240 may be positioned in an alternate location along the turbocharger casing. For example, the first RFID circuit 240 may be positioned proximate to the compressor casing. In yet another example, the first RFID circuit 240 may be positioned along the turbocharger outer casing (e.g., housing), closer to the shaft 204, turbine wheel, or compressor wheel. In one embodiment, multiple first RFID circuits 240 may be positioned in different locations on the turbocharger casing. In this way, vibration levels at different points on the turbocharger may be detected.

Figure 4:
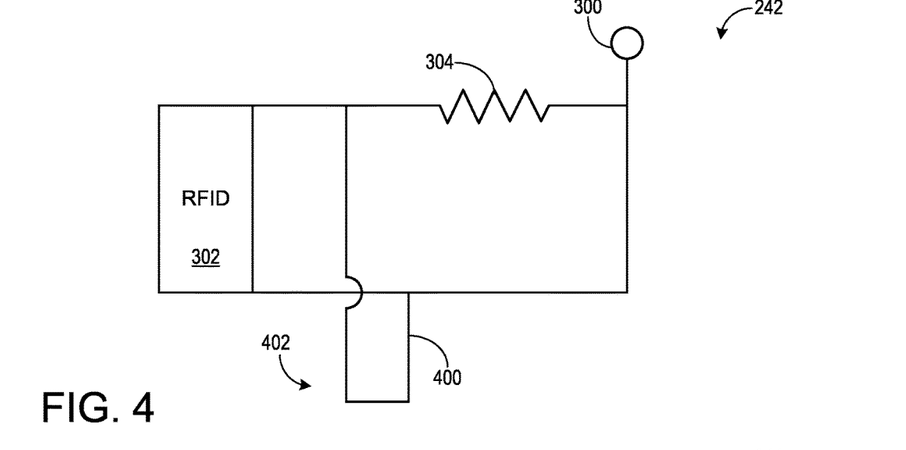

A second RFID circuit 242 is positioned on a bearing surface of the turbocharger. Specifically, the second RFID circuit 242 is shown positioned at a surface of one of the bearings 208. The second RFID circuit 242 may include a wire, the wire positioned on the surface of the bearing 208. The remaining portion of the second RFID circuit 242, including the RFID chip and antenna, may be positioned away from the bearing surface on another portion of the turbocharger (e.g. on the turbocharger casing). The antenna may be positioned on an outside casing (or surface) of the turbocharger such that an RFID reader may scan and receive a signal from the antenna. The wire of the second RFID circuit 242 may be configured to break as the bearing 208 rubs and exerts pressure on the wire with increasing turbocharger imbalance. The wire may be designed to break when the bearing exerts a pressure on the wire corresponding to the threshold vibration level (indicating turbocharged imbalance). In another example, the wire may be designed to break when an oil film surrounding the bearing and the wire breaks such that the turbocharger shaft and/or other vibrating turbocharger components contact and rub against the bearing 208 and the wire. An example of the second RFID circuit 242 is shown at FIG. 4, described further below.

In some embodiments, multiple second RFID circuits 242 may be positioned on the turbocharger with respective wires of the second RFID circuits positioned on one or more of the bearings 208. For example, a first wire of one second RFID circuit 242 may be positioned on a surface of a bearing 208 proximate to the turbine 202 while a second wire of another second RFID circuit 242 may be positioned on a surface of a bearing 208 proximate to the compressor 204.

As depicted in FIG. 2, a third RFID circuit 244 is positioned at the oil cavity 212, the oil cavity 212 directly connected to the journal bearing 208 and a turbocharger oil pressure supply sensor. As shown in more detail at FIG. 5, the third RFID circuit 244 may include a resonant diaphragm positioned in a portion of the oil cavity 212. For example, the resonant diaphragm may be positioned within the oil in the oil cavity 212. The resonant diaphragm may be designed to break when the oil cavity pressure reaches the oil cavity pressure threshold corresponding to the turbocharger imbalance threshold, as discussed above. As a result of the resonant diaphragm breaking, the impedance of the third RFID circuit 244 may change, thereby changing the signal output by the RFID chip and detected by the RFID reader. One or more of the third RFID circuits 244 may be positioned within the oil cavity 212.

The one or more RFID circuits coupled to the turbocharger 200 are not electrically coupled or communicative with the engine controller. Instead, as described above, a remote RFID reader (e.g., radiofrequency receiving device) may communicate electronically with the RFID through the antenna of the RFID circuit. Specifically, when the RFID is positioned within a threshold range of the RFID circuit, the RFID reader may obtain information from the RFID chip. The information may include turbocharger identification information, impedance of the RFID circuit, stored or real-time sensor data from sensors coupled to the RFID circuit (as described further below), and/or the like.

The RFID chips of the RFID circuits may be active, semi-active, or passive. For example, passive RFID chips may only transmit information via the antenna when the RFID reader is close enough (e.g., within a threshold range of the antenna of the RFID circuit) to provide a radiofrequency power source. Semi-active RFID chips may include a battery power source to extend a reading range (e.g., the threshold range) or log data. However, the semi-active RFID chip may only transmit data (e.g., information) when the RFID reader is within the threshold range (which may be the extended threshold range). Active RFID chips may include a battery for the transmission power source. Active RFID chips may transmit data without the presence of the RFID reader power source. Further, the active RFID chip may transmit the data to the reader (or receiving device) at a greater range than the semi-active or passive RFID chips. In one example, the active RFID chip may be constantly transmitting data to the RFID reader or receiving device.

As described further below, the RFID circuits may be designed such that when the turbocharger is imbalanced and reaches a set imbalance threshold (e.g., vibration or oil cavity pressure threshold) the impedance of the RFID circuit may change from an initial level. In one example, when the turbocharger has reached the imbalance threshold indicating turbocharger imbalance and impending failure, no signal may be emitted by the antenna and read by the reader. In another example, a signal may be output by the antenna and subsequently read by the RFID reader only when the turbocharger has reached the imbalance threshold indicating turbocharger imbalance and impending failure. In yet another example, the impedance (or resistance) may change from a first level before reaching the imbalance threshold to a second level after reaching the imbalance threshold. The first level may be higher or lower than the second level based on the circuit design. As such, the RFID reader may determine turbocharger imbalance based on the magnitude of the impedance signal output by the antenna of the RFID circuit. Specifically, the RFID chip may measure and then store the impedance level of the RFID circuit. The RFID reader may then extract the stored impedance data when the reader is brought within the threshold range of the RFID chip.

A status of each of the RFID circuits may be checked at pre-set intervals according to an engine maintenance schedule. For example, after a duration of engine use, vehicle travel, or turbocharger use, a user may position the RFID reader within a range of the RFID circuits coupled to the turbocharger. As described above, the range may be based on the type of RFID chip (e.g., active, semi-active, or passive).

The RFID reader may receive signals from multiple RFID circuits at one time. For example, if three different RFID circuits are positioned on the turbocharger, the RFID reader may receive three different signals from each of the RFID circuits. Further, each signal may be distinguished from the other based on identification data stored on the RFID chip. This identification data may include data pertaining to the type of RFID circuit (e.g., first RFID circuit, second RFID circuit, or third RFID circuit as shown in FIG. 2 and described further below at FIGS. 3-5), the location of the RFID circuit, and what type of signal (e.g., no signal, positive signal, or signal level) indicates turbocharger degradation. In other embodiments, the RFID reader may scan each RFID circuit separately, thereby receiving separate data from each RFID.

Based on the signal received by the RFID reader, the user may service and/or replace at least a portion (e.g., one component of the turbocharger such as the turbine) of the turbocharger. In one example, after servicing or replacing the turbocharger and/or reading the RFID devices, the user may reset or replace the RFID circuits on the turbocharger. For example, all of the RFID circuits described herein may be removably coupled to the turbocharger. As such, each RFID circuit (e.g., the first RFID circuit 240, second RFID circuit 242, and third RFID circuit 244) may be a consumable that is replaceable after the associated mechanical component within the circuit is broken or triggered. Thus, after each scan indicating turbocharger imbalance, a user may replace the triggered RFID circuit. In another example, the RFID circuits may be resettable such that a user may reset the circuit after the mechanical component is triggered for subsequent turbocharger monitoring. For example, the RFID circuits may include a resettable switch, resettable button, resettable spring-loaded component, or replaceable mechanical component that may allow for the RFID circuit to be reset without replacing the entire RFID circuit. In this way, the RFID circuits may be designed to be single-use or multi-use devices.

FIGS. 3-6 show example RFID circuits that may be coupled to a turbocharger as shown in FIG. 2. Each RFID circuit includes an RFID chip 302, an antenna 300, and a mechanical link or component designed to change impedance responsive to a changing input from the turbocharger (e.g., vibration or oil pressure) at a threshold frequency. As described further below, the mechanical link may be a breakable resonant link (seen in FIG. 3), a sacrificial wire (seen in FIG. 4), or two separated conductors (seen in FIG. 5). The RFID chip may be active, passive, or semi-active. Further, the RFID chip may include data stored thereon, the data including turbocharger identification information (e.g., a turbocharger identification number, model, period of use of the turbocharger, previous servicing or indicated degradation of the turbocharger), RFID circuit information (e.g., type of circuit, number of times reset if resettable, position on the turbocharger), stored impedance data, and/or stored sensor data (e.g., from a sensor electrically coupled to the RFID, as described further below). In this way, an RFID reader may track a plurality of turbochargers and identify which of the plurality of turbochargers are degraded and require servicing or replacement.

Figure 3:
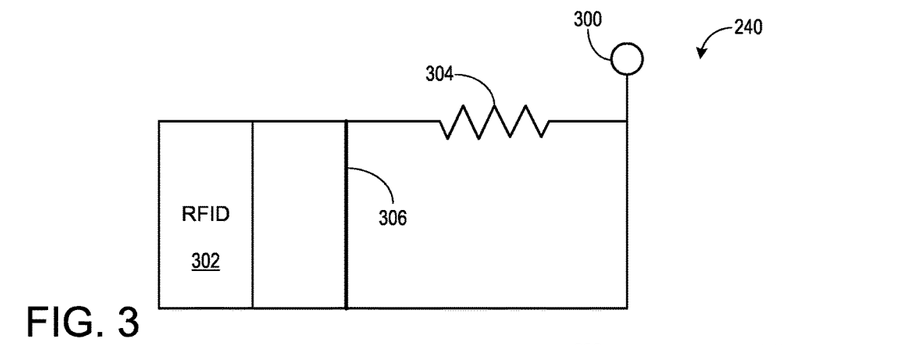
FIGS. 3-6 show RFID circuits according to embodiments of the invention.

Turning to FIG. 3, a first RFID circuit 240 is shown. The first RFID circuit 240 includes an antenna 300, RFID chip 302, and a breakable resonant link 306. As shown in FIG. 2 the breakable resonant link 306 is positioned in parallel with the RFID chip 302 and the antenna 300. Further, a resistive element 304 is positioned in series with the antenna 300. In one embodiment, the resistive element 304 is a resistor. In another embodiment, the resistive element 304 may be a capacitor, inductor, or alternate type of resistive element having a resistance greater than the resonant link 306. The positioning of the resistive element 304 and the resonant link 306 creates a short circuit, thereby causing current to flow from the RFID chip 302 and through the resonant link 306. As a result, no current may reach the antenna 300. Thus, when the resonant link 306 is not broken, an RFID reader will not receive a signal from the first RFID circuit 240.

The resonant link 306 is designed to have a natural frequency in a range corresponding to the threshold frequency range for turbocharger imbalance indicating impending failure. As discussed above, an imbalance threshold may be set including a threshold vibration amplitude (e.g., level) within a threshold frequency range. In one example, the threshold frequency range may be from about 325 Hz to about 345 Hz. As such, the resonant link 306 may be designed to have a natural frequency in the range from about 235 Hz to about 345 Hz. In an alternate embodiment, the threshold frequency range may be from about 300 Hz to about 400 Hz and the natural frequency of the resonant link 306 may be within the threshold frequency range. For example, the threshold frequency range may be turbocharger dependent. As such, the resonant link may be designed for a turbocharger such that the resonant frequency of the resonant link approximately matches the rotational frequency of the turbocharger shaft at a pre-determined operating point of detection.

As the turbocharger imbalance increases, the resonant link 306 may vibrate. When the frequency of the vibrations reaches the natural frequency of the resonant link 306, the resonant link 306 may break, thereby creating an open circuit. As a result, current may flow from the RFID chip 302 and to the antenna 300. The RFID reader may then receive a signal from the RFID chip 302, thereby indicating the turbocharger has reached the imbalance threshold and should be serviced or replaced. In this example, breaking the resonant link 306 at the set vibration threshold frequency causes a change in impedance of the first RFID circuit 240 from no measurable impedance to an impedance proportional to the resistive element 304.

The resonant link has a specific thickness, material, and density. The thickness, material, and density may be selected to achieve the natural frequency (e.g., the natural frequency within the frequency threshold range). The natural frequency of the resonant link may be defined by equation 1:

$$\omega = \omega_n \sqrt{\frac{EI}{\rho A L^4}} \quad (1)$$

wherein $\omega$ is the natural frequency of the resonant link, $\omega_n$ is a pre-determined constant of approximately 22.4, E is Young's modulus, I is the area moment of inertia of the resonant link, $\rho$ is the density of the resonant link 306, A is the cross-sectional area of the resonant link 306, and L is the length of the resonant link 306. The density and Young's modulus are based on the material of the resonant link 306. Further, the length, area moment of inertia, and cross-sectional area are all based on the size and shape of the resonant link 306. For example, the chosen thickness, cross-section shape (e.g., circular, square, rectangular), and length of the resonant link 306 dictates the I, A, and L variables in equation 1. Further, the type of material (e.g., copper, aluminum, or other conducting materials) dictates the E and $\rho$ variables in equation 1. Thus, the resonant link 306 may be designed to have the specific material, thickness, density, and size (e.g., length and cross-section) resulting in a desired natural frequency. In one example, the type of material may be chosen, thereby setting E and ρ. The material may then be shaped and sized accordingly to achieve the natural frequency. In some cases, the chosen material may already have a set cross-section and thickness. As a result, equation 1 may be rearranged to solve for the necessary length of the material to produce the chosen natural frequency.

In an alternate embodiment, the resonant link 306 may be positioned in series with the RFID chip 302 and the antenna 300. As a result, while the resonant link 306 is intact (e.g., not broken) current may flow from the RFID chip 302, through the resonant link 306, and to the antenna 300. As such, an RFID reader may receive a signal when the turbocharger has not reached the imbalance threshold, thereby indicating no turbocharger degradation. However, when the resonant link 306 breaks, an open circuit is created, thereby cutting off current flow to the antenna 300. As a result, no signal is detected by the RFID reader from the first RFID circuit 240, thereby indicating turbocharger imbalance and pending failure.

As described above with reference to FIG. 2, the first RFID circuit 240 may be coupled to a housing or outer casing of the turbocharger. In one example, the first RFID 240 circuit may include an adhesive for coupling the first RFID circuit 240 to the turbocharger. In another example, the first RFID circuit 240 may be mechanically coupled (e.g., via a bolt or screw) to the housing of the turbocharger. Further, the first RFID circuit 240 may be removably coupled to the turbocharger. In this way, the first RFID circuit 240 may include a resonant link designed to have a natural frequency matching a vibration frequency threshold of a degraded turbocharger.

FIG. 4 shows a second RFID circuit 242. The second RFID circuit 242 includes an antenna 300, a RFID chip 302, a resistive element 304, and a wire 400. In one example, the wire 400 is a sacrificial wire breakable under a threshold amount of wear or force from vibration. As shown in FIG. 4, the wire 400 is positioned in parallel with the antenna 300 and the RFID chip 302. The resistive element 304 may be similar to the resistive element described above with reference to FIG. 3. The resistive element 304 is shown positioned in series with the antenna 300 and the RFID chip 302 and in parallel with the wire 400. The positioning of the wire 400 and the resistive element 304 creates a short circuit, thereby causing current to flow from the RFID chip 302 and through the wire 400. As a result, no current flows to the antenna 300. Thus, when the wire 400 is intact and not broken, an RFID reader will not receive a signal from the second RFID circuit 242.

As described above with reference to FIG. 2, the second RFID circuit 242 may be coupled to the turbocharger. The second RFID circuit 242 may adhesively or mechanically coupled (e.g., via a bolt or screw) to the turbocharger. Further, the second RFID circuit 240 may be removably coupled to the turbocharger. More specifically, at least a portion of the wire 400 may be positioned on a surface of one or the bearings of the turbocharger (e.g., one of bearings 208 shown in FIG. 2). As shown in FIG. 2, the wire 400 includes a first end and a second end coupled to the rest of the second RFID circuit 242. A middle portion 402 of the wire 400, between the first end and the second end, may be positioned at the bearing surface of the turbocharger. In one example, the middle portion 402 of the wire 400 may be placed on top of one of the bearings. In another example, the middle portion 402 of the wire 400 may be coupled to one of the bearings with an adhesive.

While the middle portion 402 of the wire 400 is positioned on a bearing surface, the remaining portion of the second RFID circuit 242 (e.g., the RFID chip 302, antenna 300, and circuit wiring) may be positioned elsewhere on the turbocharger (e.g., not on the bearing surface). In one example, the remaining portion of the RFID circuit 242 may be coupled to a casing surrounding the shaft. In another example, the remaining portion of the second RFID circuit 242 may be coupled to a casing of the turbine wheel or the compressor wheel. In yet another example, the remaining portion of the second RFID circuit 242 may be coupled to an outer casing of the turbocharger 200. Externally mounting the RFID circuit 242 to the turbocharger by coupling the RFID circuit 242 to the outer casing of the turbocharger 200 or an alternate external location may allow for the RFID reader to be further away from the turbocharger and still communicate with the RFID circuit 242. As such, the threshold reading distance of the RFID reader may be maximized when the RFID circuit 242 is positioned external to the turbocharger. The remaining portion of the wire 400 may run from the middle portion 402 at the bearing surface and to the circuit wiring coupled to the RFID chip 302 positioned on an alternate portion of the turbocharger.

A threshold oil film thickness may be within the oil cavity coupled to the bearing. In one example, the oil film may surround the bearing and the wire, the wire positioned between the bearing and the oil film. The material and thickness of wire 400 is selected such that the middle portion 402 coupled to the bearing surface breaks (or becomes degraded enough that current cannot flow through the middle portion 402 of the wire 400) when a vibration amplitude of the turbocharger is in a threshold range. For example, the imbalance threshold of the turbocharger may include vibration levels in a g-force range from about 1 g to about 2.8 g (9.81-27.47 m/s$^2$) at a frequency in a range of about 325 Hz to about 345 Hz. In this example, the thickness and a material of the wire 400, or at least the middle portion 402 of the wire 400, are selected to break when the vibration amplitude of the turbocharger is in a range of 1-2.8 g. This g-force range may correspond to an amount of pressure and/or rubbing (e.g., wear) that occurs at the bearings due to the vibration force. In another example, the material and thickness of the wire 400 may be further selected based on the threshold thickness of the oil film. The g-force range may then correspond to a g-force that causes the oil film to break, thereby resulting in the wire 400 breaking. In yet another example, the wire 400 may not break, but change impedance when the oil film thickness decreases and/or breaks (e.g., completely breaks such that the wire 400 is exposed). The change in impedance of the wire 400 may then be measured by the RFID chip 302 and subsequently detected by the RFID reader. In this way, the threshold thickness of the oil film may also be selected based on the threshold vibration level for the imbalance threshold. In one example, the material and thickness may be chosen through mechanical testing at the imbalance threshold vibration range described above.

In one embodiment, the thickness and/or material of the middle portion 402 may be different than the rest of the wire 400. For example, the thickness of the middle portion 402 may be thicker than the rest of the wire 400, the thickness of the middle portion 402 selected such that it breaks (or degrades enough such that it cannot carry and conduct current) when the turbocharger reaches the imbalance threshold described above. In another example, the thickness of the middle portion 402 may be thinner than the rest of the wire 400. In yet another example, the middle portion 402 may have the same thickness and material as the rest of the wire 400 such that the middle portion 402 is continuous the remaining portion of the wire 400.

In an alternate embodiment, the wire 400 may be positioned in series with the antenna 300 and the RFID chip 302. As a result, while the wire 400 is intact (e.g., not broken) current may flow from the RFID chip 302, through the wire 400, and to the antenna 300. As such, an RFID reader may receive a signal when the turbocharger has not reached the imbalance threshold, thereby indicating no turbocharger degradation. However, when the wire 400 breaks (or is severed such that no current may flow from one end of the wire 400 to the other end), an open circuit is created, thereby cutting off current flow to the antenna 300. As a result, no signal is detected by the RFID reader from the second RFID circuit 242, thereby indicating turbocharger imbalance and pending failure.

Figure 5:
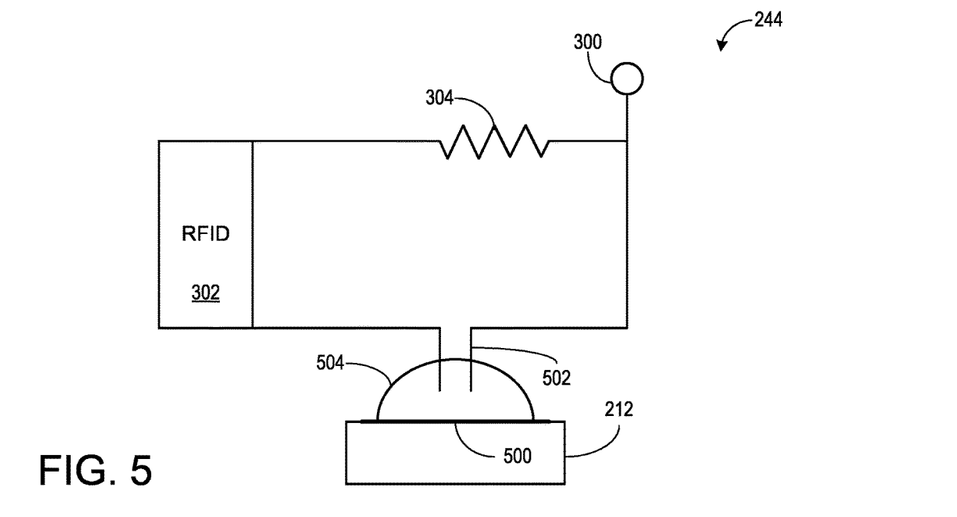

FIG. 5 shows a third RFID circuit 244. The third RFID circuit 244 includes an antenna 300, a RFID chip 302, a resistive element 304, and a resonant diaphragm 500. The resistive element 304 may be similar to the resistive element described above with reference to FIG. 3. The resistive element 304 is shown positioned in series with the antenna 300 and the RFID chip 302. The third RFID circuit 244 further includes two conducting elements 502 (e.g., wires) separated by a space (e.g., gap). The two conducting elements 502 are coupled to the wiring of the circuit and positioned in series with the antenna 300, resistive element 304, and RFID circuit 302. However, the space between the two conducting elements 502 creates an open circuit, thereby preventing current from reaching the antenna 300. As such, an RFID reader positioned within range of the third RFID circuit 244 will not receive a signal from the antenna 300. No signal from the third RFID circuit 244 may be indicative of the turbocharger operating below the imbalance threshold and thereby indicating a non-degraded turbocharger.

First ends of the two conducting elements 502 are coupled to the circuit wiring. Second ends of the two conducting elements 502 are positioned within a vacuum cavity 504. The vacuum cavity 504 may include a fully enclosed space containing air. The vacuum cavity 504 is separated from oil in an oil cavity (e.g., oil cavity 212 shown in FIG. 2) by the resonant diaphragm 500, the oil cavity surrounding the shaft of the turbocharger. The resonant diaphragm 500 is positioned within the oil cavity. In one embodiment, the vacuum cavity 504 and the second ends of the conducting elements 502 may also be positioned within the oil cavity. In another embodiment, only the resonant diaphragm 500 may be positioned within the oil cavity and the remaining components of the third RFID circuit 244 may be positioned outside of the oil cavity. For example, the RFID chip 302 and the antenna 300 may be coupled to a casing of the turbocharger, outside of the oil cavity.

In one example, the resonant diaphragm is breakable under a threshold amount of oil pressure, the threshold amount of oil pressure corresponding to the turbocharger imbalance threshold. For example, the resonant diaphragm may be designed to break under an oil pressure amplitude of about 6.9 kPa to about 41.5 kPa.

In another example, the resonant diaphragm 500 is designed to have a natural frequency in a range corresponding to the threshold frequency range for turbocharger imbalance indicating impending failure. As discussed above, an imbalance threshold may be set including a threshold oil pressure amplitude (e.g., level) within a threshold frequency range. For example, the imbalance threshold may include oil pressure amplitudes in a range from about 6.9 kPa to about 41.5 kPa fluctuating at a frequency in range from about 325 Hz to 345 Hz (e.g., approximately once per turbocharger revolution). Thus, the resonant diaphragm 500 may be designed to have a natural frequency in the range from about 235 Hz to about 345 Hz. In alternate embodiments, the imbalance threshold may be set to a frequency range greater or smaller than the above range and the resonant diaphragm 500 may be designed to have a natural frequency matching the alternate imbalance threshold range.

As the turbocharger imbalance increases, the oil cavity pressure amplitude and frequency of pressure oscillations may increase. When the frequency of the oil cavity pressure oscillations reaches the natural frequency of the resonant diaphragm 500, the resonant diaphragm 500 may break (or fracture at least partially), thereby allowing oil to fill the vacuum cavity 504. Once oil fills the vacuum cavity 504 and covers the second ends of the two conducting elements 502, the circuit may be closed. As a result, current may flow from one of the two conducting elements 502 and to the other of the two conducting elements 502, thereby allowing current to flow to the antenna 300. When a RFID reader is positioned within range of the third RFID circuit 244, the reader may now receive a signal from the circuit indicating the turbocharger is degraded and imbalanced. In response, a user may service and/or replace the turbocharger. In this example, breaking the resonant diaphragm 500 at the set oil pressure threshold frequency and subsequently filling the vacuum cavity 504 with oil causes a change in impedance of the third RFID circuit 244 from no measurable impedance to an impedance proportional to the resistive element 304.

The resonant diaphragm 500 has a specific thickness, material, and density. The thickness, material, and density may be selected to achieve the natural frequency (e.g., the natural frequency within the frequency threshold range) described above. The process of selecting the material, thickness, size (e.g., diameter, width), shape (e.g., circular, square, diamond, oblong, rectangular, or the like), and/or density may be similar as described above with the resonant link 306. In one example, the type of material may be chosen, thereby setting the material properties and density used in determining the natural frequency. The material may be any material capable of breaking under the imbalance threshold and maintaining a fluid barrier before it is broken. For example, the material may be any one of a polymer, plastic, and/or flexible metal with an endurance threshold. For example, the endurance threshold may be an endurance limit of the material defined as an amount of cyclic stress that may be applied to the material without causing fatigue failure. The material may then be shaped and sized accordingly to achieve the natural frequency.

The RFID circuits shown in FIGS. 3-5 are configured to transition from producing no signal (from a short or open circuit) to producing a readable signal (by breaking the short or closing the circuit) or transition from producing a readable signal to producing no signal (by creating an open circuit). However, in alternate embodiments similar circuit configurations may be used to change the circuit impedance, capacitance, or inductance without needing to break a component of the circuit. For example, the resonant link 306, wire 400, and/or resonant diaphragm 500 may be designed such that the circuit impedance may change as the vibration and/or pressure exerted on these components increases. The RFID chip may then measure the changing impedance and store this value. An RFID reader may then receive data from the RFDI chip, including the changing impedance of the RFID chip and indicate turbocharger degradation when the impedance has reached a threshold indicating turbocharger imbalance.

Additionally, the RFID circuits described above may include additional or alternate resistive components such as resistors, capacitors, or inductors. The different resistive components may be used to achieve varying impedance, capacitance, or inductance readings.

Further, in one embodiment, only one RFID circuit (one of the first RFID circuit 240, second RFID circuit 242, or third RFID circuit 244) may be coupled to one turbocharger. The one RFID circuit may then provide information (via a signal, no signal, or impedance level) to the RFID circuit as to the health of the turbocharger. In an alternate embodiment, two or more RFID circuits may be coupled to the same turbocharger. For example, a first RFID circuit may produce a signal only when the turbocharger is not degraded (has not reached the imbalance threshold) and a second RFID circuit may produce a signal only when the turbocharger is degraded (when it has reached the turbocharger imbalance threshold). In this way, the RFID reader may determine turbocharger degradation based on which RFID circuit it receives a signal from. In another example, two or more RFID circuits may be positioned in different locations on the turbocharger (e.g., on the shaft vs. the turbine vs. the compressor) in order to determine degradation of specific turbocharger components.

Figure 6:
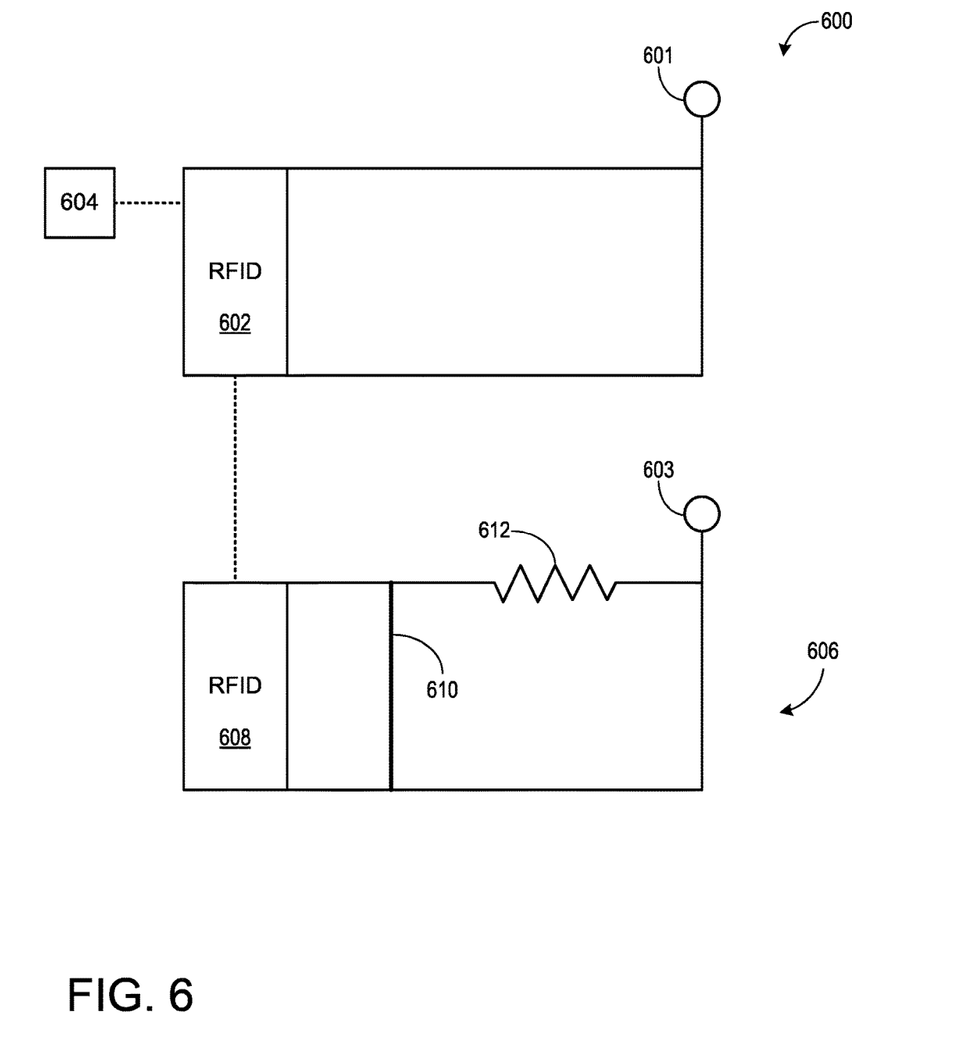
Figure 7:
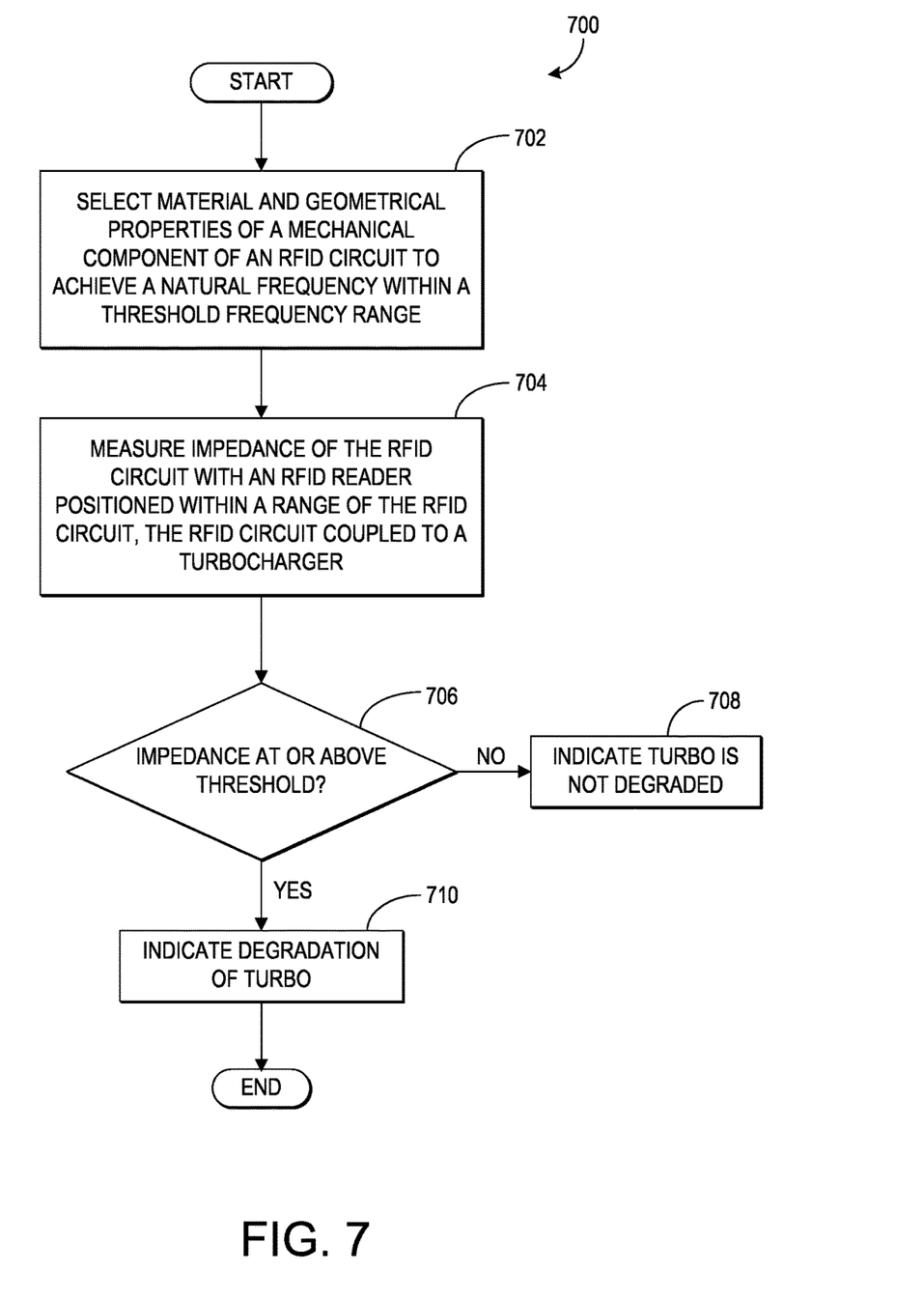
FIG. 7 shows a method for determining turbocharger degradation using an RFID circuit according to an embodiment of the invention.

FIG. 6 shows another embodiment of an RFID circuit system including a first RFID circuit 600 coupled to a sensor 604. Specifically, the first RFID circuit 600 includes a first antenna 300, a first RFID chip 602, and the sensor 604. The sensor 604 is coupled to the first RFID chip 602 through an input/output port. The input/output port may be any electrical connection for connecting the sensor 604 to the RFID chip 602 such that they communicate electronically. The sensor 604 may be an accelerometer, pressure sensor, or another type of vibration sensor. The sensors 604 may be coupled to the turbocharger housing (e.g., casing) or within the oil cavity in order to monitor the vibration and/or oil pressure levels of the turbocharger. The first RFID chip 602 may include more than one input/output port in order to accommodate more than one sensor. For example, an accelerometer and a pressure sensor may be electronically coupled to separate ports on the RFID chip 602.

One or more sensors 604 plugged into the first RFID chip 602 may record and/or rewrite measured data continuously on the first RFID chip 602. An RFID reader may then indicate degradation of the turbocharger responsive to the recorded data being within set imbalance thresholds (such as the vibration and oil pressure imbalance threshold described above).

In another embodiment, the first RFID circuit 600 may be electrically coupled to a second RFID circuit 606. The second RFID circuit 606 includes a second RFID chip 608, a second antenna 603, and a mechanical link 610 designed to change impedance with a changing input from the turbocharger. The second RFID circuit 606 further includes a resistive element 612. As shown in FIG. 6, the second RFID circuit is the first RFID circuit 240 shown in FIG. 3. In alternate embodiments, the second RFID circuit 606 may be any of the RFID circuits shown in FIGS. 3-5.

The second RFID 608 may be an activation RFID. As such, when the mechanical link 610 breaks, the second RFID 608 may activate (e.g., turn on) the first RFID chip 602 such that it may begin recording data measured by the sensor 604. Activating the first RFID chip 602 may include sending an activation signal from the second RFID chip 608 to the first RFID chip 602. In other examples, if the circuit includes a different mechanical component (e.g., a resonant diaphragm or wire), the second RFID chip 608 may be triggered to turn on the first RFID chip 602 responsive to a change in the different mechanical component. For example, the resonant diaphragm or wire breaking. In this way, when the turbocharger reaches its imbalance threshold, a component of the second RFID circuit 606 may break or change impedance. In one example, the activation signal may be triggered by a change in impedance by a threshold amount, the threshold amount based on the impedance thresholds discussed above. As a result of receiving the activation signal, the first RFID circuit 600 may begin recording vibration and/or oil pressure data. The recorded data may then be accessible by the RFID reader upon bringing the RFID reader within range of the first RFID circuit 600. The RFID reader may then determine if the turbocharger is imbalanced, if the imbalance is increasing, and how long the turbocharger may have until catastrophic failure.

The sensor data may be obtained while an engine to which the turbocharger is coupled is operating (e.g., while combustion is occurring), and may be carried out while a vehicle in which the turbocharger is positioned is travelling. Obtaining the data from the RFID circuit using an RFID reader may occur when the engine is offline and not operating. In other embodiments, the data may be obtained during engine operation when the RFID reader is positioned within the threshold range of the RFID circuit.

Though the RFID circuits described herein are described as being couplable to a turbocharger, they may alternatively be coupled to an alternate rotating device subject to imbalance. Alternate rotating devices subject to imbalance may include fans, compressors, propellers, or the like. Further, the impedance thresholds, including the threshold frequency ranges may differ based on the specific rotating device. As such, the mechanical components of the RFID circuit may be designed to have natural frequencies and/or mechanical strength tolerances within the designated imbalance threshold ranges.

In this way, a system may comprise a rotating device and a radiofrequency identification (RFID) circuit coupled to the rotating device, the RFID circuit including an RFID chip, an antenna, and a mechanical link configured to change impedance responsive to a changing input from the rotating device. In one embodiment, the mechanical link is a breakable resonant link. The changing input is a vibration level in a range of about 1 g to about 2.8 g at a frequency in a range of about 325 Hz to about 345 Hz. Thus, the breakable resonant link is configured to break upon experiencing a vibration level in a range of about 1 g to about 2.8 g at a frequency in a range of about 325 Hz to about 345 Hz, and when the breakable resonant link breaks, the impedance of the mechanical link (comprising the breakable resonant link) changes from a low value (e.g., from a simple resistance perspective, less than 1 ohm) to a relatively very high value (e.g., open circuit). The vibration level in a range of about 1 g to about 2.8 g at a frequency in a range of about 325 Hz to about 345 Hz is indicative of a possible mechanical failure or impending mechanical failure of the turbocharger or other rotating machine. Thus, when the impedance of the circuit changes from the very low value to the relatively very high value, this correspondingly is indicative of the possible mechanical failure or impending mechanical failure.

In another embodiment, the mechanical link is a wire positioned on a bearing surface of the rotating device. The changing input is a vibration level in a range of about 1 g to about 2.8 g at a frequency in a range of about 325 Hz to about 345 Hz. Thus, the wire is configured to degrade or break to a point which current may not flow through the wire (e.g., from one end of the wire to the opposite end of the wire) upon experiencing a vibration level in a range of about 1 g to about 2.8 g at a frequency in a range of about 325 Hz to about 345 Hz. When the wire degrades or breaks, the impedance of the mechanical link (comprising the wire) changes from a low value (e.g., from a simple resistance perspective, less than 1 ohm) to a relatively very high value (e.g., open circuit). The breaking of the wire may allow current to flow to the antenna of the RFID circuit, thereby increasing the circuit impedance read by an RFID reader from a relatively low value (e.g., an unreadable signal) before breaking the wire to a relatively higher value after breaking the wire. When the impedance of the circuit changes from the relatively low value to the relatively higher value, this correspondingly is indicative of the possible mechanical failure or impending mechanical failure of the rotating device.

In yet another embodiment, the mechanical link is two conductors separated by a space, the two conductors positioned in a vacuum cavity, the vacuum cavity separated from an oil cavity surrounding a bearing of a shaft of the rotating device by a resonant diaphragm. The changing input is an oil pressure amplitude within the oil cavity greater than a threshold pressure in a threshold frequency range. As one example, the threshold pressure is about 6.9 kPa and the threshold frequency range is about 325 Hz to about 345 Hz. Thus, the resonant diaphragm is configured to break (or rupture to a point where oil may pass through the resonant diaphragm and into the vacuum cavity) upon experiencing the oil pressure amplitude greater than the threshold pressure (e.g., about 6,900 Pa) at a threshold frequency range (e.g., about 325 Hz to about 345 Hz).

In another embodiment, the resonant diaphragm may be configured to break upon experiencing an oil pressure amplitude at a level below 6,900 Pa at a frequency range of about 325 Hz to about 345 Hz. Further, the frequency range may be a range including frequencies above 345 Hz and/or below 325 Hz.

When the resonant diaphragm breaks, the impedance of the mechanical link (comprising the resonant diaphragm) changes from a low value (e.g., from a simple resistance perspective, less than 1 ohm) to a relatively very high value (e.g., open circuit). The breaking of the resonant diaphragm may allow current to flow to the antenna of the RFID circuit, thereby increasing the circuit impedance read by an RFID reader from a relatively low value (e.g., an unreadable signal) before breaking the resonant diaphragm to a relatively higher value after breaking the resonant diaphragm. When the impedance of the RFID circuit changes from the relatively low value to the relatively higher value, this correspondingly is indicative of the possible mechanical failure or impending mechanical failure of the rotating device.

In another embodiment, the RFID circuit includes an input/output port (e.g., electrical connection). The system further comprises a sensor coupled to the input/output port for measuring the changing input from the rotating device. In one example, the sensor is an accelerometer and the changing input is a g-force in a range of about 1 g to about 2.8 g. In another example, the sensor is an oil pressure sensor and the changing input is an oil pressure amplitude greater than about 6,900 Pa. In one embodiment, the rotating device is a turbocharger.

FIG. 7 shows a method 700 for determining turbocharger degradation and impending failure. At 702 the method includes selecting material and geometrical properties of a mechanical component of an RFID circuit to achieve a natural frequency within a threshold frequency range. As discussed above, the RFID circuit may include a mechanical component such as a resonant link (shown in FIG. 3), a wire (shown in FIG. 4), or a resonant diaphragm (shown in FIG. 5). The material and geometrical properties may be selected such that the mechanical component has a natural frequency within a set turbocharger imbalance frequency range. As such, when the mechanical component breaks or degrades such that no current may flow through the component, turbocharger imbalance and degradation may be indicated (e.g., imbalance indicating pending turbocharger failure). The material properties may include one or more of the type of material and the density of the material. The geometrical properties may include one or more of the thickness and size (e.g., cross-section, length, width, diameter, or the like) of the mechanical component. The method may further include coupling the RFID circuit to a desired position on the turbocharger (e.g., via an adhesive or mechanical coupling).

At 704, the method includes measuring an impedance of the RFID circuit with an RFID reader positioned within a range of the RFID circuit. For example, the method at 704 may include positioning the RFID reader within the range of the RFID circuit and then receiving a signal from the RFID circuit. In one example, the signal received from the RFID circuit may include either a confirmation of a signal or no signal, or an impedance of the RFID circuit. In other embodiments, the signal received from the RFID circuit may include a current, capacitance, or inductance level.

At 706, the method includes determining if the measured impedance is at or above a threshold. The threshold may be based on an impedance indicating an amount of turbocharger imbalance. In one example, the impedance at or above the threshold includes receiving a readable non-zero impedance (e.g., the circuit is emitting a signal). In another example, the impedance at or above the threshold includes a non-readable impedance wherein the RFID reader receives no signal from the RFID circuit.

If the impedance is at or above the threshold, the method continues on to 710 to indicate degradation of the turbocharger. Indicating degradation may include indicating via a light or message on the RFID reader that the turbocharger should be serviced or replaced. Alternatively at 706, if the impedance is below the threshold, the method continues on to 708 to indicate the turbocharger is not degraded. For example, no light or message may appear on the RFID reader. In another example, a message indicating the turbocharger is healthy may appear on the RFID reader.

As one embodiment, a method comprises measuring an impedance of a radiofrequency identification (RFID) circuit with an RFID reader positioned within a range of the RFID circuit, the RFID circuit coupled to a turbocharger. The method further comprises indicating degradation of the turbocharger when the impedance reaches a threshold impedance indicating turbocharger imbalance, the RFID circuit including a mechanical component having material and geometrical properties providing the mechanical component with a natural frequency within a threshold range. In one example, the threshold impedance is a readable non-zero impedance. In another example, the threshold impedance is a non-readable impedance due to the RFID reader receiving no signal from the RFID circuit.

As another embodiment, a method comprises flowing fluid through a rotating device, a radiofrequency identification (RFID) circuit coupled to the rotating device. The RFID circuit includes an RFID chip, an antenna, and a mechanical link configured to change impedance with a changing input from the rotating device. In one example the rotating device may be a turbocharger of an engine wherein the fluid is exhaust gas flowing through a turbine. The flow of exhaust gas through the turbine causes rotation of the turbine, thereby causing rotation of a compressor coupled to the turbine.

In this way, an RFID circuit coupled to a turbocharger may be used to determine turbocharger health. Specifically, the RFID circuit may be used to indicate whether a turbocharger is imbalanced and when the turbocharger has reached an imbalance level indicating pending turbocharger failure. An RFID reader may check the RFID circuits at regular intervals to determine turbocharger imbalance without requiring additional sensors or inputs into the engine controller. Measuring turbocharger imbalance in this way may reduce engine costs while also simplifying engine monitoring.

As one embodiment, a system comprises a turbocharger and a radiofrequency identification (RFID) circuit positioned on the turbocharger, the RFID circuit including an RFID chip, an antenna, and a breakable resonant link, the resonant link having a natural frequency in a range from about 325 Hz to about 345 Hz. The system further comprises a resistive element positioned in series with the antenna, the resistive element including one or more of a resistor, capacitor, or inductor.

As described above, the resonant link is configured to break upon experiencing a vibration level in a range of about 1 g to about 2.8 g at a frequency in a range of about 325 Hz to about 345 Hz. In one embodiment, the resonant link is positioned in parallel with the RFID chip and the antenna, the resonant link acting as a short circuit, thereby preventing current from reaching the antenna. As a result, no measurable signal (e.g., impedance) may be output by the RFID circuit. Upon breaking the resonant link (creating an open circuit at the resonant link), current may flow to the antenna. As a result, a measurable signal (and higher impedance than prior to breaking the link) may be output by the antenna. This measurable signal of a higher impedance may be indicative of turbocharger degradation and/or impending turbocharger failure.

In another embodiment, the resonant link is positioned in series with the RFID chip and the antenna. The resonant link creates an open circuit after it is broken, thereby resulting in no current flowing to the antenna. Thus, before the resonant link breaks the antenna may output a readable signal and after the resonant link breaks the antenna outputs no readable signal.

The natural frequency of the resonant link is provided by a thickness, material, size (e.g., cross-sectional shape and area), and density of the resonant link. Further, at least part of the RFID circuit is removably coupled to an outer casing of the turbocharger.

As another embodiment, a system comprises a turbocharger and a radiofrequency identification (RFID) circuit positioned on the turbocharger, the RFID circuit including an RFID chip, an antenna, and a wire, the wire positioned on a bearing surface of the turbocharger. The wire is configured to wear with increasing turbocharger vibration due to turbocharger imbalance. Specifically, the wire is configured to break when the turbocharger imbalance reaches a threshold. For example, a thickness and a material of the wire are selected to break when a vibration amplitude of the turbocharger is in a range of about 1 g to about 2.8 g at a frequency of about 325 Hz to about 345 Hz. The system further comprises a resistive element positioned in series with the antenna. In one example, the wire is positioned in parallel with the antenna and the RFID chip, the wire creating a short circuit before the wire breaks. In another example, the wire is positioned in series with the antenna and the RFID chip, the wire creating an open circuit upon breaking of the wire. A middle portion of the wire is positioned on and coupled to the bearing surface, the bearing surface being on one of a plurality of bearings of a shaft of the turbocharger.

In yet another embodiment, a system comprises a turbocharger, an oil cavity coupled to a bearing of a turbocharger shaft of the turbocharger, and a radiofrequency identification (RFID) circuit including an RFID chip, an antenna, and a resonant diaphragm, the resonant diaphragm positioned in the oil cavity and having a natural frequency in a threshold frequency range (e.g., a range of about 325 to about 345 Hz), the resonant diaphragm configured to break when imbalance of the turbocharger causes oil pressure in the oil cavity to oscillate at a frequency substantially the same as the natural frequency. The thickness, material, and density of the resonant diaphragm are selected to achieve the natural frequency.

The RFID circuit further includes a first conducting element and a second conducting element separated by a space, a first end of the first conducting element and a first end of the second conducting element coupled to circuit wiring attached to the RFID chip and the antenna and a second end of the first conducting element and a second end of the second conducting element positioned within a vacuum cavity, the vacuum cavity separated from the oil cavity by the resonant diaphragm. Upon reaching the natural frequency, the resonant diaphragm may break, thereby allowing oil to fill the vacuum cavity. The oil may act as a conductor when it contacts both the first conducting element and the second conducting element, thereby allowing current to flow through the RFID circuit and to the antenna. Thus, when the RFID circuit outputs a readable signal, turbocharger degradation and/or impending turbocharger failure may be indicated.

An another embodiment, a system comprises a turbocharger, a first radiofrequency identification (RFID) circuit coupled to the turbocharger and including a first RFID chip, a first antenna, and a sensor coupled to the first RFID chip through an input/output port, and a second RFID circuit coupled to the turbocharger and including a second RFID chip, a second antenna, and a mechanical link configured to change impedance with a changing input from the turbocharger, the second RFID circuit electrically coupled to the first RFID circuit.

The sensor includes one or more of an accelerometer or an oil pressure sensor. Further, the first RFID circuit is configured to record data from the sensor upon receiving an input from the second RFID circuit, the input from the second RFID circuit including an activation signal triggered by the change in impedance by a threshold amount.

In an embodiment, a system comprises a rotating device and a radiofrequency identification (RFID) circuit coupled to the rotating device. The RFID circuit includes an RFID chip, an antenna, and a mechanical link configured to change impedance responsive to a changing input from the rotating device. Operation of the RFID circuit is based at least in part on the change of impedance. For example, the RFID circuit may be configured, upon the occurrence of the changing input and the change of impedance of the mechanical link responsive to the changing input, to transition from an inoperational state (e.g., not powered) to an operational state (e.g., powered), for the RFID chip to control the antenna for wireless transmission of an RFID signal to a location away from the RFID circuit. For example, if the system is deployed in a vehicle, then the RFID signal may be transmitted to an RFID reader (that is, a device configured to receive the RFID signal) located elsewhere in the vehicle than the RFID circuit and rotating device.

As one example, the changing input is a vibration level within a threshold force range at a frequency in a threshold frequency range. In one example, the threshold force range is about 1 g to about 2.8 g and the threshold frequency range is about 325 Hz to about 345 Hz.

In another embodiment of the system, the mechanical link is a breakable resonant link and the changing input is a vibration level in a range of about 1 g to about 2.8 g at a frequency in a range of about 325 Hz to about 345 Hz. Thus, upon the occurrence of the vibration level, the breakable resonant link is configured to break, which results in the change of impedance.

In another embodiment of the system, the resonant link is positioned in parallel with the RFID chip and the antenna. The resonant link acts as a short circuit and prevents current from flowing to the antenna until the resonant link is broken by the changing input (e.g., the vibration level). Thus, when the vibration level occurs, the resonant link is configured to break, which allows current to flow to the RFID circuit.

In another embodiment of the system, the resonant link is positioned in series with the RFID chip and the antenna. The resonant link creates an open circuit after it is broken by the changing input (e.g., the vibration level), thereby stopping current from flowing to the antenna. Thus, prior to the changing input, the RFID circuit is operational, and when the vibration level of the changing input occurs, the RFID circuit is no longer operational.

In another embodiment of the system, the mechanical link is a wire positioned on a bearing surface of the rotating device. The changing input is a vibration level in a range of about 1 g to about 2.8 g at a frequency in a range of about 325 Hz to about 345 Hz. Thus, upon the occurrence of the vibration level, the wire changes impedance in response (e.g., due to breaking of the wire, or the wire detaching from a support surface to which it is electrically and mechanically attached), which results in a change in a present operational state of the RFID circuit.

In another embodiment, a system comprises a turbocharger or other rotating device, a first radiofrequency identification (RFID) circuit coupled to the rotating device and including a first RFID chip, a first antenna, and a sensor coupled to the first RFID chip, and a second RFID circuit coupled to the rotating device and including a second RFID chip, a second antenna, and a mechanical link configured to change impedance responsive to a changing input from the rotating device. The second RFID circuit is electrically coupled to the first RFID circuit. Operation of at least one of the first RFID circuit or the second RFID circuit is based at least in part on the change of impedance.

As used herein, "turbocharger" includes devices as described above where engine intake air is compressed by a compressor that is driven solely by an exhaust-powered turbine, and superchargers and other devices for compressing engine intake air that are powered other than by exhaust gases impinging on a turbine to drive a compressor. For example, a supercharger may be powered by an electric motor, or via a gear system or other mechanical connection to an output shaft of the engine. Other turbochargers may have multiple modes of operation, e.g., compressor driven by an exhaust-powered turbine in one mode of operation and by a motor or mechanical connection in another mode of operation.

RFID "chip" refers generally to a circuit or sub-circuit that is configured, in at least one mode of operation, to perform an RFID function as described herein, and unless otherwise specified, is not limited to a particular packaging. In embodiments, however, the circuit or sub-circuit portion of the RFID is housed in a relatively small package, e.g., area defined by the largest two dimensions of the housing is no more than 7 $cm^2$.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a rotating device; and
a radiofrequency identification (RFID) circuit coupled to the rotating device, the RFID circuit including an RFID chip, an antenna, and a mechanical link configured to change impedance responsive to a changing input from the rotating device, wherein the mechanical link comprises a breakable resonant link and wherein the changing input is a vibration level within a threshold force range at a frequency in a threshold frequency range.

2. The system of claim 1, wherein the resonant link is positioned in parallel with the RFID chip and the antenna, the resonant link acting as a short circuit and preventing current from flowing to the antenna until the resonant link is broken by the changing input.

3. The system of claim 2, wherein the rotating device comprises a turbocharger.

4. The system of claim 1, wherein the resonant link is positioned in series with the RFID chip and the antenna and wherein the resonant link creates an open circuit after it is broken by the changing input, thereby stopping current from flowing to the antenna.

5. The system of claim 4, wherein the rotating device comprises a turbocharger.

6. The system of claim 1, wherein the resonant link has a natural frequency in a range of the threshold frequency range and wherein the natural frequency of the resonant link is provided by a thickness, length, cross-section, material, and density of the resonant link.

7. The system of claim 6, wherein the rotating device comprises a turbocharger.

8. The system of claim 1, wherein the rotating device comprises a turbocharger.

9. A system, comprising:
a rotating device; and
a radiofrequency identification (RFID) circuit coupled to the rotating device, the RFID circuit including an RFID chip, an antenna, and a mechanical link configured to change impedance responsive to a changing input from the rotating device, wherein the mechanical link comprises a wire positioned on a bearing surface of the rotating device and wherein the changing input is a vibration level in a threshold force range at a frequency in a threshold frequency range.

10. The system of claim 9, wherein the rotating device comprises a turbocharger.

11. A system, comprising:
a rotating device; and
a radiofrequency identification (RFID) circuit coupled to the rotating device, the RFID circuit including an RFID chip, an antenna, and a mechanical link configured to change impedance responsive to a changing input from the rotating device, wherein the mechanical link comprises two conductors separated by a space, the two conductors positioned in a vacuum cavity, the vacuum cavity separated from an oil cavity surrounding a bearing of a shaft of the rotating device by a resonant diaphragm, and wherein the changing input is an oil pressure amplitude within the oil cavity at or greater than a threshold pressure at a frequency in a threshold frequency range.

12. The system of claim 11, wherein the rotating device comprises a turbocharger.

13. A system, comprising:
a turbocharger;
an oil cavity coupled to a bearing of a turbocharger shaft of the turbocharger; and
a radiofrequency identification (RFID) circuit including an RFID chip, an antenna, and a resonant diaphragm, the resonant diaphragm positioned in the oil cavity and having a natural frequency in a threshold frequency range, the resonant diaphragm configured to break when imbalance of the turbocharger causes oil pressure in the oil cavity to oscillate at a frequency substantially the same as the natural frequency.

14. The system of claim 13, wherein a thickness, material, and density of the resonant diaphragm are selected to achieve the natural frequency.

15. The system of claim 13, wherein the RFID circuit further includes a first conducting element and a second conducting element separated by a space, a first end of the first conducting element and a first end of the second conducting element coupled to circuit wiring attached to the RFID chip and the antenna, and a second end of the first conducting element and a second end of the second conducting element positioned within a vacuum cavity, the vacuum cavity separated from the oil cavity by the resonant diaphragm.

16. A system, comprising:
a rotating device;
a first radiofrequency identification (RFID) circuit coupled to the rotating device and including a first RFID chip, a first antenna, and a sensor coupled to the first RFID chip; and
a second RFID circuit coupled to the rotating device and including a second RFID chip, a second antenna, and a mechanical link configured to change impedance responsive to a changing input from the rotating device, the second RFID circuit electrically coupled to the first RFID circuit, wherein the first RFID circuit is configured to record data from the sensor upon receiving an input from the second RFID circuit, the input from the second RFID circuit including an activation signal triggered by a change in the impedance by a threshold amount.

17. The system of claim 16, wherein the rotating device comprises a turbocharger.

18. A system, comprising:
a rotating device;
a first radiofrequency identification (RFID) circuit coupled to the rotating device and including a first RFID chip, a first antenna, and a sensor coupled to the first RFID chip; and
a second RFID circuit coupled to the rotating device and including a second RFID chip, a second antenna, and a mechanical link configured to change impedance responsive to a changing input from the rotating device, the second RFID circuit electrically coupled to the first RFID circuit, wherein the mechanical link includes one of a resonant link, a resonant diaphragm, or a breakable wire.

19. The system of claim 18, wherein the rotating device comprises a turbocharger.

* * * * *